United States Patent
Seiho

(10) Patent No.: US 11,296,803 B2
(45) Date of Patent: Apr. 5, 2022

(54) APPARATUS AND METHOD FOR POSITION ESTIMATION

(71) Applicant: ALLIED TELESIS HOLDINGS K.K., Tokyo (JP)

(72) Inventor: Itano Seiho, Tokyo (JP)

(73) Assignee: ALLIED TELESIS HOLDINGS K.K., Tokyo (JP)

( * ) Notice: Subject to any disclaimer, the term of this patent is extended or adjusted under 35 U.S.C. 154(b) by 100 days.

(21) Appl. No.: 16/909,227

(22) Filed: Jun. 23, 2020

(65) Prior Publication Data

US 2020/0403716 A1    Dec. 24, 2020

(30) Foreign Application Priority Data

Jun. 24, 2019  (JP) ............................ JP2019-116233

(51) Int. Cl.
    *H04B 17/27*   (2015.01)
    *G01S 5/06*    (2006.01)
    *H04B 17/318*  (2015.01)

(52) U.S. Cl.
    CPC ............. *H04B 17/27* (2015.01); *G01S 5/06* (2013.01); *H04B 17/318* (2015.01)

(58) Field of Classification Search
    CPC ......... H04B 17/27; H04B 17/318; G01S 5/14; G01S 5/021; G01S 11/06; G01S 5/06; H04W 52/245; H04W 52/283
    See application file for complete search history.

(56) References Cited

U.S. PATENT DOCUMENTS

| | | | |
|---|---|---|---|
| 2009/0303112 A1* | 12/2009 | Alizadeh-Shabdiz | G01S 5/0257 342/357.48 |
| 2012/0225678 A1* | 9/2012 | Cha | H04W 24/08 455/457 |
| 2013/0188626 A1* | 7/2013 | Lakhzouri | G01S 5/0236 370/338 |
| 2015/0189618 A1* | 7/2015 | Park | G01S 19/48 455/456.5 |
| 2015/0289101 A1* | 10/2015 | Park | H04W 4/023 455/456.1 |

(Continued)

FOREIGN PATENT DOCUMENTS

JP   2007071816 A    3/2007
WO   2017199972 A1  11/2017

*Primary Examiner* — Danh C Le
(74) *Attorney, Agent, or Firm* — Concept IP LLP; Michael Zarrabian

(57) ABSTRACT

A position estimation apparatus estimates the position of a radio communication device that outputs a signal, where the apparatus includes a distance estimating section, a first position estimating section, a second position estimating section, and a final position estimating section, where the distance estimating section estimates actual distances between wireless access points receiving the signal and the radio communication device as estimated distances based on the reception strength of the signal, where the first position estimating section estimates the position of the radio communication device, where the second position estimating section estimates a circle centered at one of the wireless access points with the maximum reception strength, and where the position estimated by the final position estimating section is estimated as the position of the radio communication device.

7 Claims, 15 Drawing Sheets

(56) References Cited

U.S. PATENT DOCUMENTS

| | | | |
|---|---|---|---|
| 2015/0319580 A1* | 11/2015 | Kim | H04W 24/08 |
| | | | 455/456.1 |
| 2016/0018508 A1* | 1/2016 | Chen | G01S 5/0252 |
| | | | 455/456.1 |
| 2016/0219485 A1* | 7/2016 | Kwon | H04W 36/32 |
| 2018/0084521 A1* | 3/2018 | Liu | G01S 5/0252 |
| 2020/0236004 A1* | 7/2020 | Tavares | H04B 17/318 |
| 2020/0280949 A1* | 9/2020 | Sandhya Rani Siva Raju | |
| | | | H04W 64/00 |

* cited by examiner

APPARATUS AND METHOD FOR POSITION ESTIMATION

CROSS-REFERENCE TO RELATED APPLICATIONS

This application claims priority under 35 U.S.C. § 119 to Japanese Application No. 2019-116233, filed Jun. 24, 2019, the contents of which are hereby incorporated by reference herein for all purposes.

TECHNICAL FIELD

Embodiments relate generally to position estimation, and more particularly to position estimation for a radio device.

BACKGROUND

There has conventionally been known estimating the position of a radio device for radio communications based on the distances between the radio device and three or more wireless access points. The trilateration and the spring model, for example, have been known as position estimation methods for a radio device.

SUMMARY

It is however difficult to increase the accuracy of estimation of the distances between a radio device and access points, though the estimation itself may be provided. The position of a radio device, if tried to be estimated, may differ significantly from the actual position of the radio device when a low-accuracy distance estimate is used to perform the trilateration or the spring model.

It is hence an object of the present invention to estimate the position of a radio device accurately.

According to the present invention, a position estimation apparatus for estimation of the position of a radio communication device that outputs a signal, includes: a distance estimating section that estimates actual distances between wireless access points that receive the signal and the radio communication device as estimated distances based on the reception strength of the signal; a first position estimating section that estimates the position of the radio communication device based on the estimated distances for any three or more of the wireless access points; a second position estimating section that estimates, as the position of the radio communication device, a circle centered at one of the wireless access points with the maximum reception strength and having one of the estimated distances estimated for the center of the circle as a radius; and a final position estimating section that estimates, as the position of the radio communication device, the intersection of the circle and a half line having the center as one end and passing through the position estimated by the first position estimating section, wherein the position estimated by the final position estimating section is estimated as the position of the radio communication device.

The thus constructed position estimation apparatus estimates the position of a radio communication device that outputs a signal. A distance estimating section estimates actual distances between wireless access points that receive the signal and the radio communication device as estimated distances based on the reception strength of the signal. A first position estimating section estimates the position of the radio communication device based on the estimated distances for any three or more of the wireless access points. A second position estimating section estimates, as the position of the radio communication device, a circle centered at one of the wireless access points with the maximum reception strength and having one of the estimated distances estimated for the center of the circle as a radius. A final position estimating section estimates, as the position of the radio communication device, the intersection of the circle and a half line having the center as one end and passing through the position estimated by the first position estimating section. The position estimated by the final position estimating section is estimated as the position of the radio communication device.

According to the position estimation apparatus of the present invention, the distance estimating section may be further arranged to estimate the estimated distances based on a propagation factor, and the propagation factor may be determined based on: the reception strength of inter-access-point communication signals that one of the wireless access points receives from another of the wireless access points; the distance between the one wireless access point and the another wireless access point; and the transmission power of the another wireless access points.

According to the position estimation apparatus of the present invention, an average value of a plurality of reception strengths of inter-access-point communication signals at different measurement time points may be used as the reception strength of the inter-access-point communication signals.

According to the position estimation apparatus of the present invention, two or more others of the wireless access points may exist additionally as the another wireless access point, and an average value of propagation factors for the two or more other wireless access points may be used as the propagation factor.

According to the position estimation apparatus of the present invention, the distance estimating section may be arranged to estimate the estimated distances based on the transmission power of the radio communication device, and the transmission power of the radio communication device may be determined based on a maximum value of the reception strength of the signal at all the wireless access points.

According to the position estimation apparatus of the present invention, the transmission power of the radio communication device may be determined, assuming that the radio communication device exists in the vicinity of the wireless access point where the reception strength of the signal has the maximum value and that the vicinity is a free space.

According to the present invention, a position estimation method for estimating the position of a radio communication device that outputs a signal, includes: estimating actual distances between wireless access points that receive the signal and the radio communication device as estimated distances based on the reception strength of the signal; estimating the position of the radio communication device based on the estimated distances for any three or more of the wireless access points; estimating, as the position of the radio communication device, a circle centered at one of the wireless access points with the maximum reception strength and having one of the estimated distances estimated for the center of the circle as a radius; and estimating, as the position of the radio communication device, the intersection of the circle and a half line having the center as one end and passing through the position estimated by the estimating the position of the radio communication device, wherein the position estimated by the estimating the intersection is estimated as the position of the radio communication device.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Preferred embodiment of the present invention will hereinafter be described with reference to the accompanying drawings.

Figure 1:
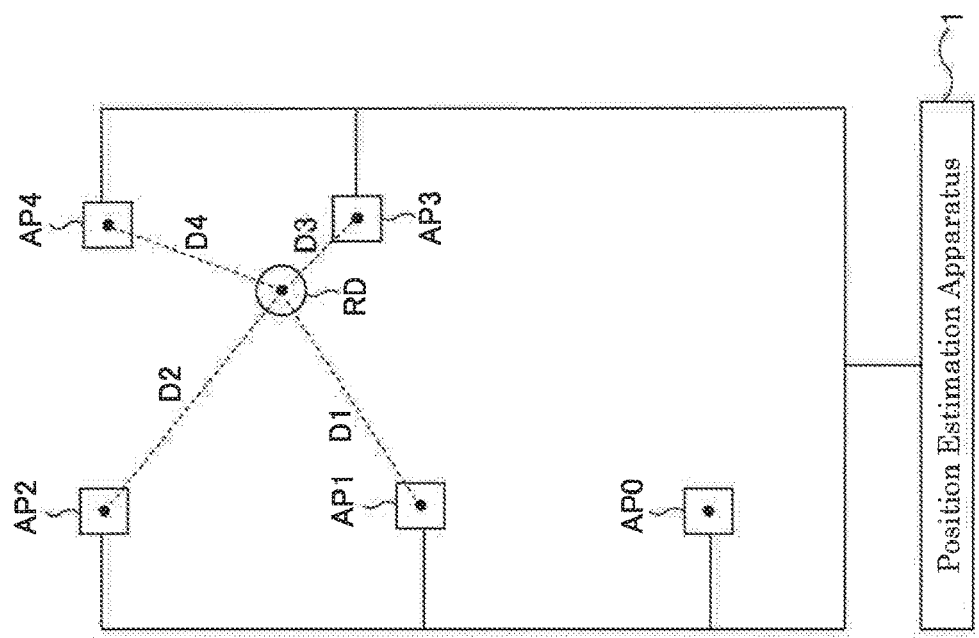
FIG. 1 outlines an example of the arrangement of wireless LAN access points AP0 to AP4 and a radio device (radio communication device) RD according to an embodiment of the present invention.

FIG. 1 outlines an example of the arrangement of wireless LAN access points AP0 to AP4 and a radio device (radio communication device) RD according to an embodiment of the present invention.

The radio device (radio communication device) RD is intended to wirelessly output a signal and is, for example, a CR (Convenience Radio), but without being limited thereto, may be a personal computer having a radio communication feature or a wireless LAN access point (other than AP0 to AP4).

The wireless LAN access points AP0, AP1, AP2, AP3, and AP4 (AP0 to AP4) are access points that receive a signal from the radio device RD. In some cases, the wireless LAN access points will hereinafter be referred to simply as access points. Note here that in the arrangement example shown in FIG. 1, the access point AP0 is too far from the radio device RD to receive a signal from the radio device RD.

The access point AP1 is arranged to measure the reception strength RSSI1 of a signal transmitted from the radio communication device RD. The access point AP2 is arranged to measure the reception strength RSSI2 of a signal transmitted from the radio communication device RD. The access point AP3 is arranged to measure the reception strength RSSI3 of a signal transmitted from the radio communication device RD. The access point AP4 is arranged to measure the reception strength RSSI4 of a signal transmitted from the radio communication device RD. It is noted that the reception strengths RSSI1 to RSSI4 each mean RSSI (i.e. Received Signal Strength Indicator).

The actual distance D1 is a distance between the access point AP1 and the radio communication device RD. The actual distance D2 is a distance between the access point AP2 and the radio communication device RD. The actual distance D3 is a distance between the access point AP3 and the radio communication device RD. The actual distance D4 is a distance between the access point AP4 and the radio communication device RD. The actual distance D3 is shortest among the actual distances D1, D2, D3, and D4.

The position estimation apparatus 1 is arranged to estimate the position of the radio communication device RD. The position estimation apparatus 1 is in wired connection (by, for example, a communication cable) with the access points AP0 to AP4. The position estimation apparatus 1 is arranged to receive reception strengths RSSI1 to RSSI4 from the access points AP1 to AP4.

It is noted that the embodiment of the present invention is based on the premise that the position estimation apparatus 1 is in wired connection with the access points AP0 to AP4. However, the position estimation apparatus 1 may be implemented in any one of the access points AP0 to AP4. In this case, the access point in which the position estimation apparatus 1 is implemented is arranged to wirelessly receive measurement results of the reception strengths from the other access points.

Figure 2:
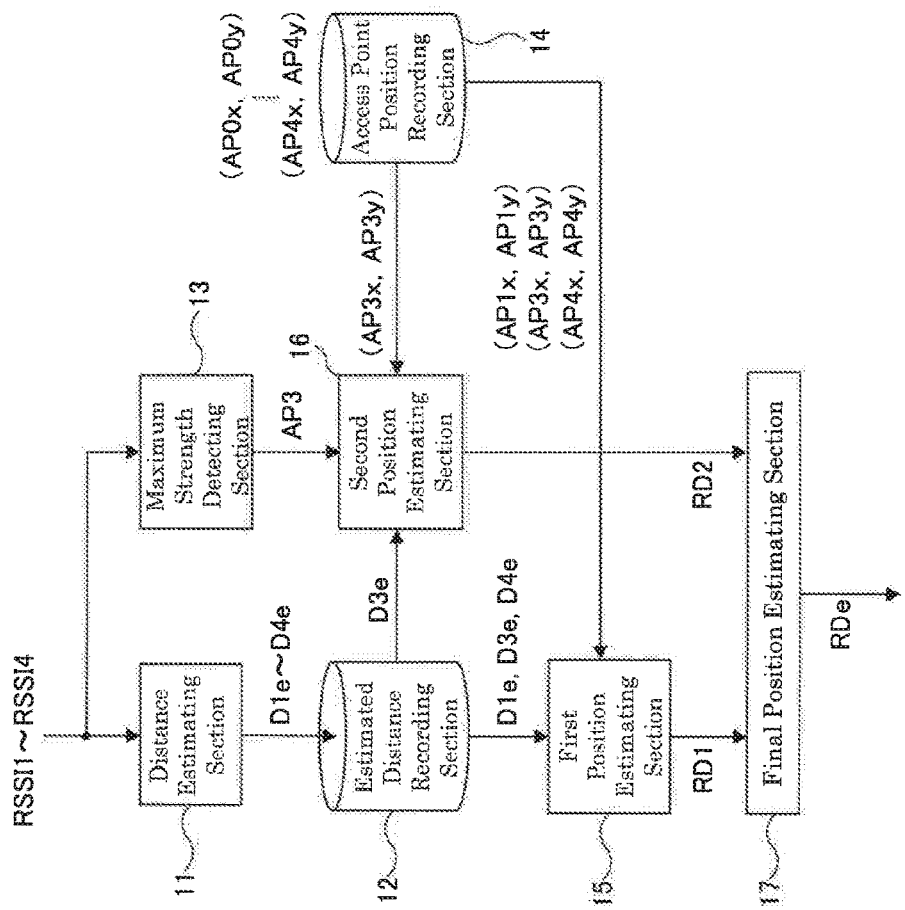
FIG. 2 is a functional block diagram showing the configuration of the position estimation apparatus 1 according to the embodiment of the present invention.

FIG. 2 is a functional block diagram showing the configuration of the position estimation apparatus 1 according to the embodiment of the present invention. The position estimation apparatus 1 according to the embodiment of the present invention includes a distance estimating section 11, an estimated distance recording section 12, a maximum strength detecting section 13, an access point position recording section 14, a first position estimating section 15, a second position estimating section 16, and a final position estimating section 17.

The distance estimating section 11 is arranged to estimate actual distances D1 to D4 between the access points AP1 to AP4 that receive a signal and the radio communication device RD as estimated distances D1e to D4e based on the reception strengths RSSI1 to RSSI4 of the signal, a propagation factor pf (to be described hereinafter) and the transmission power Txp [dBm] of the radio communication device RD. It is noted that the distance estimating section 11 is arranged to receive the reception strengths RSSI1 to RSSI4 from the access points AP1 to AP4.

Figure 4:
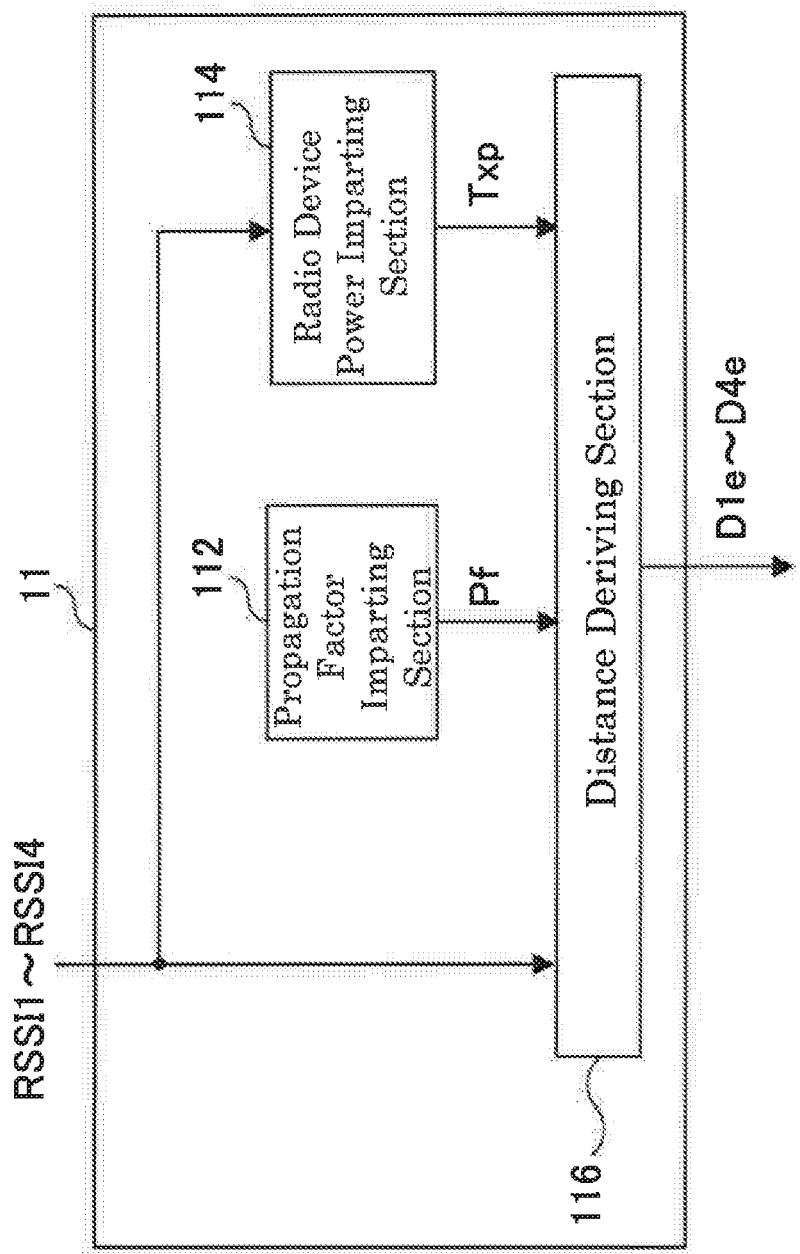
FIG. 4 is a functional block diagram showing the configuration of the distance estimating section 11.

FIG. 4 is a functional block diagram showing the configuration of the distance estimating section 11. The distance estimating section 11 has a propagation factor imparting section 112, a radio device power imparting section 114, and a distance deriving section 116.

The distance deriving section 116 is arranged to receive the reception strengths RSSI1 to RSSI4 from the access points AP1 to AP4, receive a propagation factor pf (non-dimensional) from the propagation factor imparting section 112, and receive the transmission power Txp [dBm] of the radio communication device RD from the radio device power imparting section 114. The distance deriving section 116 is arranged to derive the estimated distance Die (where "i" represents an integer of 1 to 4) using the following formula (1).

$$\text{Estimated Distance Die}[m] = 10^{\frac{Txp - RSSI - 20\log_{10}\frac{4\pi}{\lambda}}{10pf}} \qquad (1)$$

where pf represents a propagation factor (non-dimensional) in the vicinity of each access point, RSSI represents RSSI1 to RSSI4 [dBm], and λ represents a wavelength [m] of the signal transmitted from the radio communication device RD. A propagation factor in the vicinity of each access point APi and RSSIi are assigned to the formula (1) to obtain the estimated distance Die. For example, a propagation factor in the vicinity of the access point AP3 is assigned to pf in the formula (1) and RSSI3 is assigned to RSSI in the formula (1) to obtain the estimated distance D3e.

The propagation factor imparting section 112 is arranged to impart the propagation factor pf to the distance deriving section 116.

Figure 5:
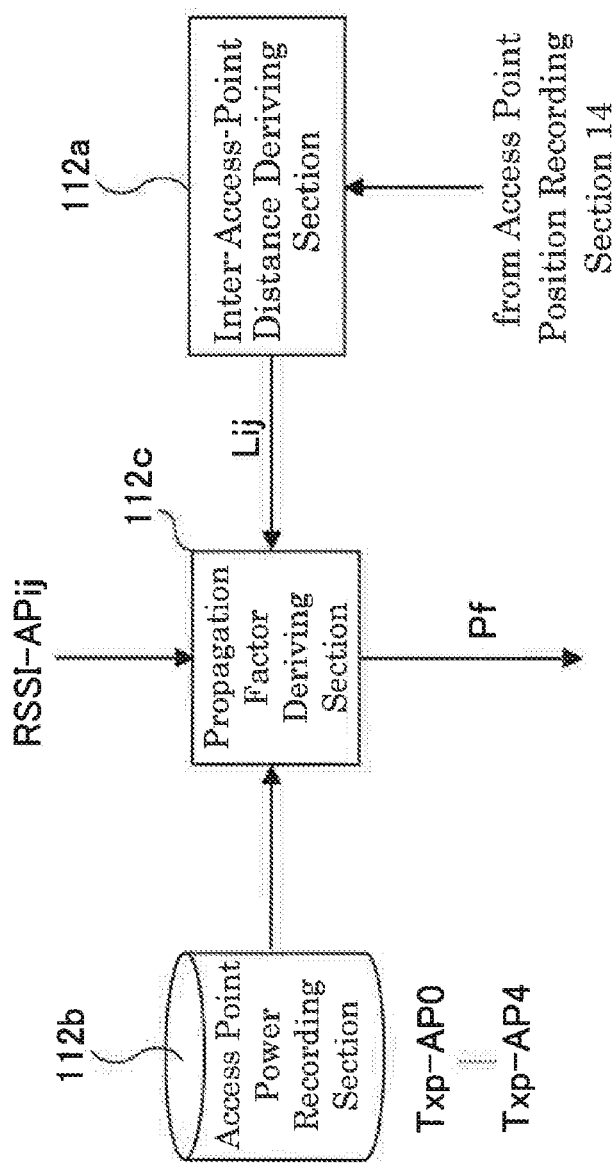
FIG. 5 is a functional block diagram showing the configuration of the propagation factor imparting section 112.

FIG. 5 is a functional block diagram showing the configuration of the propagation factor imparting section 112. The propagation factor imparting section 112 has an inter-access-point distance deriving section 112a, an access point power recording section 112b, and a propagation factor deriving section 112c.

Here, the reception strength of an inter-access-point communication signal that one of the access points APi (where "i" represents an integer of 1 to 4) receives from another of the access points APj (where "j" represents an integer of 1 to 4 different from "i") is defined as RSSI-APij. The distance between the one access point APi and the another access point APj is defined as Lij [m]. The transmission power of the another access point APj is defined as Txp-APj [dBm].

The inter-access-point distance deriving section 112a is arranged to read the x coordinates and the y coordinates of the access points APi and APj out of the access point position recording section 14 to be described hereinafter to derive the distance Lij.

The access point power recording section 112b is arranged to record the transmission power Txp-AP0 to Txp-AP4.

The propagation factor deriving section 112c is arranged to receive the reception strength RSSI-APij from APi, receives the distance Lij from the inter-access-point distance deriving section 112a, and reads the transmission power Txp-APj out of the access point power recording section 112b. The propagation factor deriving section 112c is arranged to derive the propagation factor based on the reception strength RSSI-APij, the distance Lij, and the transmission power Txp-APj. Specifically, the propagation factor deriving section 112c is arranged to derive the propagation factor pf using the following formula (2) and impart it to the distance deriving section 116. Note here that Txp-APj is expressed as Txp, RSSI-APij is expressed as RSSI, and Lij is expressed as L in the formula (2). Also, λ represents a wavelength [m] of the inter-access-point communication signal.

$$\text{Propagation Factor } pf = \frac{Txp - RSSI - 20\log_{10}\frac{4\pi}{\lambda}}{10\log_{10}L} \qquad (2)$$

Figure 6:
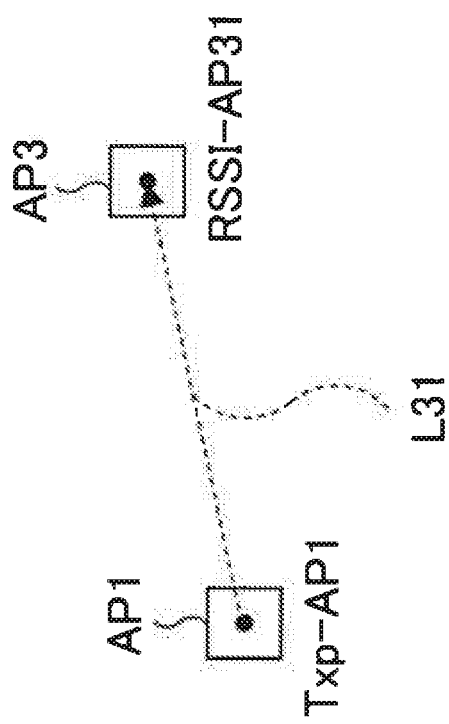
FIG. 6 show the reception strength at AP3, the distance between AP1 and AP3, and the transmission power of AP1 when an inter-access-point communication signal is transmitted from AP1 to AP3.

FIG. 6 show the reception strength at AP3, the distance between AP1 and AP3, and the transmission power of AP1 when an inter-access-point communication signal is transmitted from AP1 to AP3. A method for derivation of the propagation factor pf will be described with reference to FIG. 6.

An inter-access-point communication signal, when transmitted at the transmission power Txp-AP1 from AP1 (another access point) to AP3 (one access point), is received by AP3 at the reception strength RSSI-AP31. It is noted that the distance between AP1 and AP3 is L31. Hence, the transmission power Txp-AP1 is assigned to Txp in the formula (2), the reception strength RSSI-AP31 to RSSI in the formula (2), and L31 to L in the formula (2) to derive the propagation factor pf.

It is noted that the reception strength RSSI-APij may employ an average value of multiple reception strengths at different measurement time points. For example, in the case of a measurement once every hour, an average value of measured values for 24 hours may be used.

Also, AP4 and further AP2 may exist additionally as the another access point, though only AP1 in the example of FIG. 6. Two or more others of the access points may thus exist additionally as the another access point. In this case, if the one access point is AP3, the propagation factor pf31 in the case where the another access point is AP1, the propagation factor pf32 in the case where the another access point is AP2, and the propagation factor pf34 in the case where the another access point is AP4 are to be derived by the propagation factor deriving section 112c using the formula (2). In this case, an average value of these three values (propagation factors pf31, pf32, and pf34) may be used as the propagation factor in the vicinity of AP3.

The radio device power imparting section 114 is arranged to impart the transmission power Txp [dBm] of the radio communication device RD to the distance deriving section 116.

Figure 7:
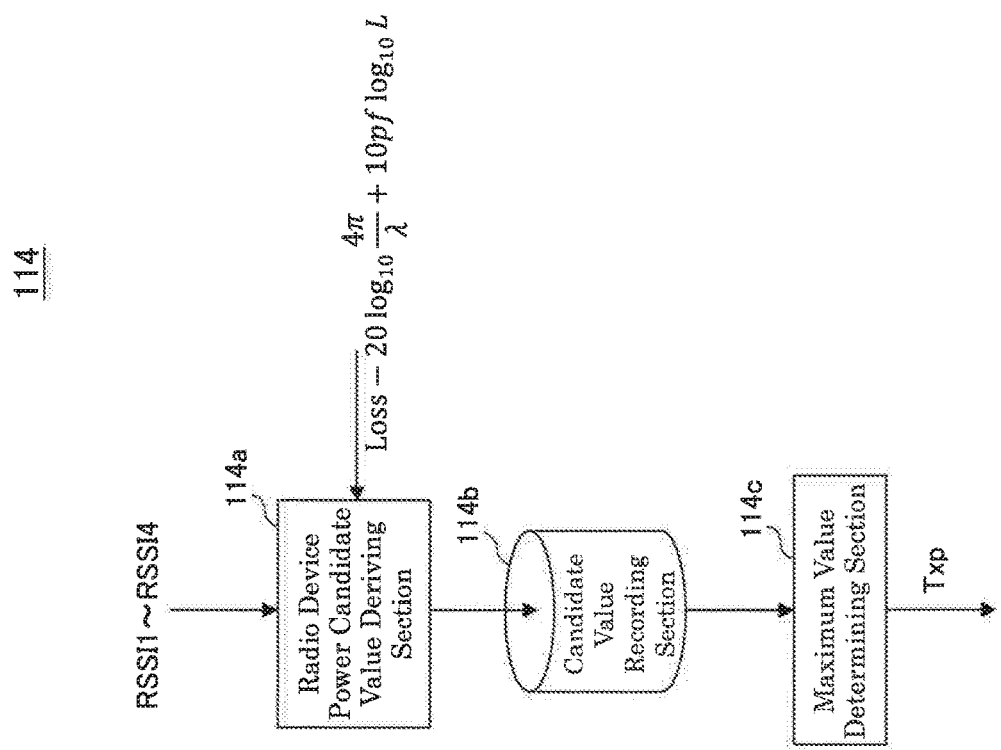
FIG. 7 is a functional block diagram showing the configuration of the radio device power imparting section 114.

FIG. 7 is a functional block diagram showing the configuration of the radio device power imparting section 114. The radio device power imparting section 114 has a radio device power candidate value deriving section 114a, a candidate value recording section 114b, and a maximum value determining section 114c.

The radio device power candidate value deriving section 114a is arranged to receive the reception strengths RSSI1 to RSSI4 from the access points AP1 to AP4 and derive a candidate value for the transmission power of the radio device RD based on a maximum value of the reception strength of the signal from the radio device RD at all the access points AP1 to AP4.

Note here that the candidate value for the transmission power of the radio device RD is determined, assuming that the radio device RD exists in the vicinity of (e.g. at 1 m or less from) the access point where the reception strength of the signal from the radio device RD has the maximum value and that the vicinity is a free space.

Specifically, the radio device power candidate value deriving section 114a is arranged to derive the propagation factor pf using the following formula (3) and impart it to the distance deriving section 116. Note here that the maximum value of the reception strengths RSSI1 to RSSI4 is expressed as RSSI in the formula (3). Also, λ represents a wavelength [m] of the signal transmitted from the radio communication device RD.

$$\text{Candidate Value of Transmission Power} = \qquad (3)$$
$$RSSI + \text{Loss} - 20\log_{10}\frac{4\pi}{\lambda} + 10pf\log_{10}L$$

It is noted that Loss represents −1 (a rounded value of the loss at the radio device RD). Also, L [m] represents the distance between the radio device RD and the access point where the reception strength has the maximum value and is, for example, 1 m, but may be another value as long as it can be taken as the vicinity, because it is assumed that the radio device RD exists in the vicinity of (e.g. at 1 m or less from) the access point as described above. Further, pf=2.0 because it is assumed that the vicinity of the access point where the reception strength has the maximum value is a free space as described above.

The candidate value recording section 114b is arranged to record a candidate value for the transmission power of the radio device RD derived by the radio device power candidate value deriving section 114a.

The maximum value determining section 114c is arranged to determine the maximum value of candidate values recorded in the candidate value recording section 114b as the transmission power of the radio device RD.

A candidate value is determined based on a maximum value of the reception strength of the signal from the radio device RD at all the access points AP1 to AP4. In addition, the maximum value of candidate values is determined as the transmission power of the radio device RD. The transmission power of the radio device RD is thus determined based on a maximum value of the reception strength of the signal from the radio device RD at all the access points AP1 to AP4.

Figure 8A:
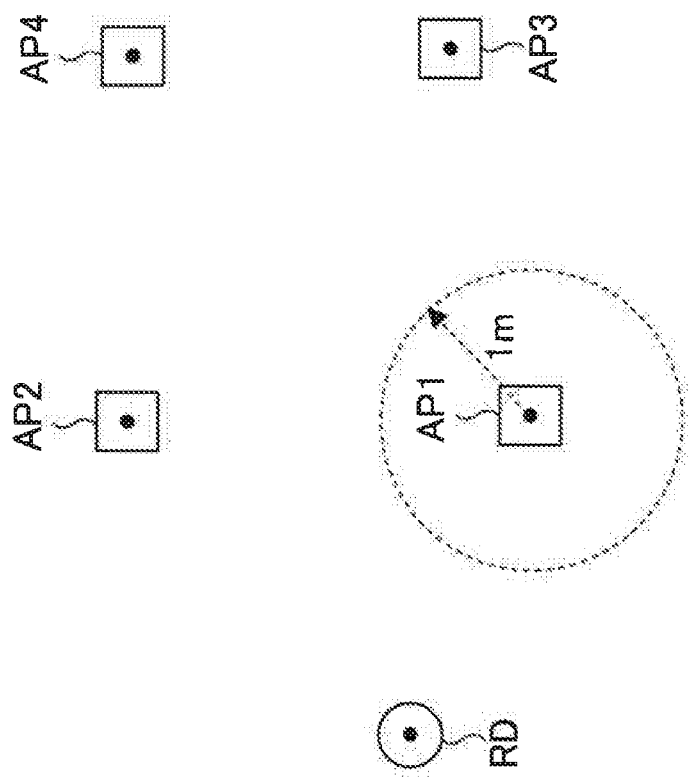
FIG. 8A outlines an example of the position of a moving radio device RD.
Figure 8B:
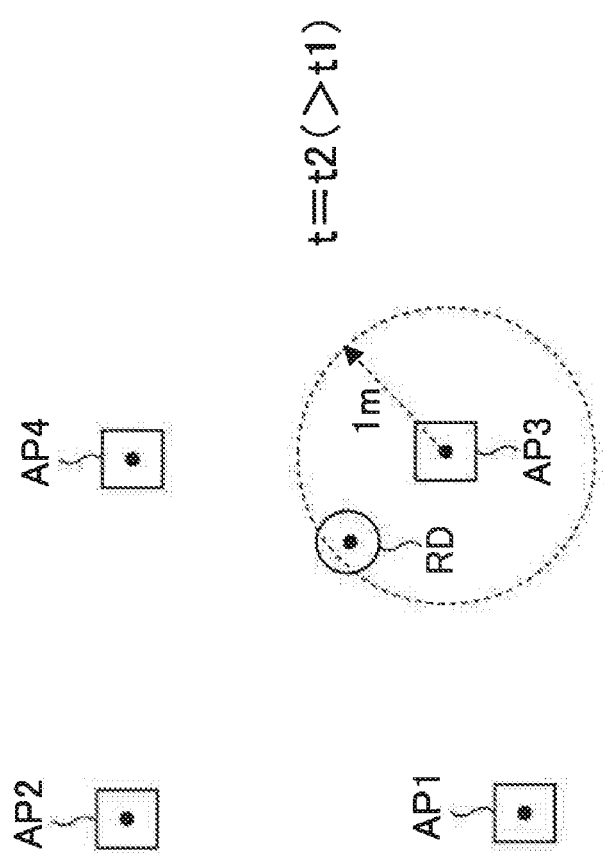
FIG. 8B outlines an example of the position of a moving radio device RD.
Figure 8C:
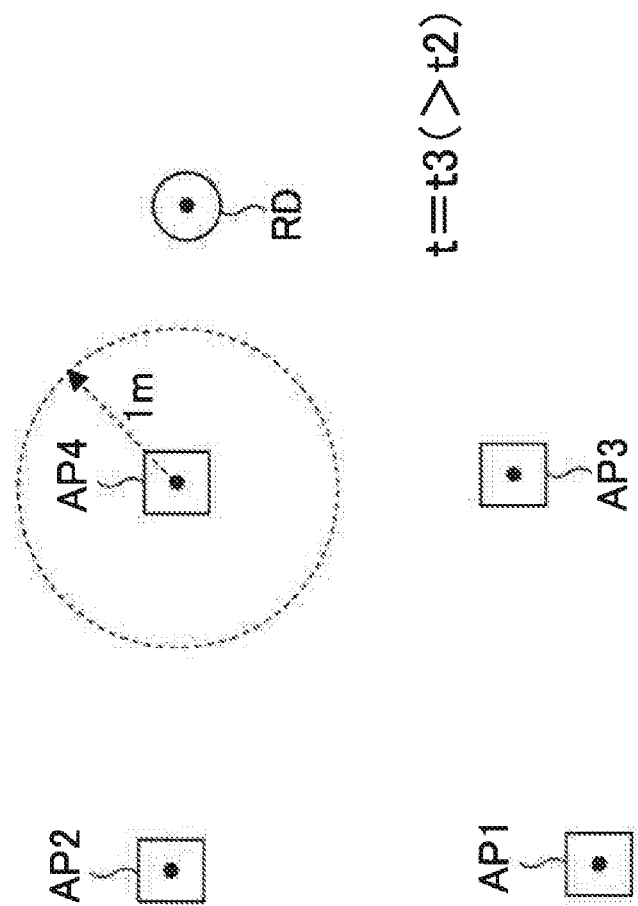
FIG. 8C outlines an example of the position of a moving radio device RD.

FIGS. 8A, 8B and 8C outline an example of the position of a moving radio device RD. First, at time t=t1, the radio device RD is to the left of the access point AP1 and closest to AP1 among AP1 to AP4, whereby RSSI1 is maximum among RSSI1 to RSSI4. Accordingly, the radio device power candidate value deriving section 114a is arranged to assign RSSI1 (in FIG. 8A) to RSSI in the formula (3), derive a candidate value for the transmission power of the radio device RD, and record it in the candidate value recording section 114b. However, the candidate value is not correct because the radio device RD is not in the vicinity of (at 1 m or less from) AP1.

Next, at time t=t2 (>t1), the radio device RD is at 1 m or less from the access point AP3 and closest to AP3 among AP1 to AP4, whereby RSSI3 is maximum among RSSI1 to RSSI4. Accordingly, the radio device power candidate value deriving section 114a is arranged to assign RSSI3 (in FIG. 8B) to RSSI in the formula (3), derive a candidate value for the transmission power of the radio device RD, and record it in the candidate value recording section 114b. It is noted that the candidate value is correct because the radio device RD is in the vicinity of (at 1 m or less from) AP3.

Finally, at time t=t3 (>t2), the radio device RD is to the right of the access point AP4 and closest to AP4 among AP1 to AP4, whereby RSSI4 is maximum among RSSI1 to RSSI4. Accordingly, the radio device power candidate value deriving section 114a is arranged to assign RSSI4 (in FIG. 8C) to RSSI in the formula (3), derive a candidate value for the transmission power of the radio device RD, and record it in the candidate value recording section 114b. However, the candidate value is not correct because the radio device RD is not in the vicinity of (at 1 m or less from) AP4.

It is noted that the radio device RD generally comes into the vicinity of any of the access points while moving. Also, when a new access point is added, the radio device RD may come into the vicinity of the newly added access point.

The second and following terms of the formula (3) take the same values for all the cases shown in FIGS. 8A, 8B, and 8C. Accordingly, when RSSI in the formula (3) is maximum, the candidate value is also maximum. Here, RSSI in the formula (3) take the maximum value for the case shown in FIG. 8B because the distance between the radio device RD and the access point is shorter in the case shown in FIG. 8B than in the cases shown in FIGS. 8A and 8C. Accordingly, the candidate value for the case shown in FIG. 8B is maximum among the candidate value for the case shown in FIG. 8A, the candidate value for the case shown in FIG. 8B, and the candidate value for the case shown in FIG. 8C that are recorded in the candidate value recording section 114b. The candidate value for the case shown in FIG. 8B is thus determined (i.e. correct) as the transmission power of the radio device RD.

The estimated distance recording section 12 is arranged to receive and record, from the distance estimating section 11, the estimated distances D1e to D4e estimated in the distance estimating section 11.

The maximum strength detecting section 13 is arranged to receive the reception strengths RSSI1 to RSSI4 from the access points AP1 to AP4 to detect the maximum reception strength and output the access point where the maximum reception strength is measured (AP3 in the example of FIG. 1).

The access point position recording section 14 is arranged to record the positions of the access points AP0 to AP4. For example, the access point position recording section 14 is arranged to record the x coordinate and the y coordinate (AP0x, AP0y) to (AP4x, AP4y) of the access points AP0 to AP4.

The first position estimating section 15 is arranged to estimate the position of the radio communication device RD based on the estimated distances for any three or more of the access points. For example, the position of the radio communication device RD is estimated using the trilateration based on the smaller three of the estimated distances D1e to D4e (e.g. the estimated distance D1e for AP1, the estimated distance D3e for AP3, and the estimated distance D4e for AP4). It is noted that the first position estimating section 15 is arranged to read the estimated distances D1e, D3e, D4e out of the estimated distance recording section 12 and read the xy coordinates of AP1, AP3, AP4 (AP1x, AP1y), (AP3x, AP3y), (AP4x, AP4y) out of the access point position recording section 14 for use in the trilateration.

Also, the position of the radio communication device RD estimated by the first position estimating section 15 is referred to as first estimated position RD1.

The second position estimating section 16 is arranged to estimate, as the position of the radio communication device RD, a circle RD2 centered at the access point AP3 with the maximum reception strength and having one (D3e) of the estimated distances estimated for the center (access point AP3) of the circle as a radius. It is noted that the second position estimating section 16 is arranged to receive AP3 from the maximum strength detecting section 13, read information on AP3 out of the estimated distance recording section 12 and the access point position recording section 14 (i.e. read the estimated distance D3e from the estimated distance recording section 12 and the xy coordinate of AP3 (AP3x, AP3y) from the access point position recording section 14) for use in derivation of the circle RD2.

Also, the position (circle RD2) of the radio communication device RD estimated by the second position estimating section 16 is referred to as second estimated position RD2.

The final position estimating section 17 is arranged to receive the first estimated position RD1 from the first position estimating section 15 and the second estimated position RD2 and its center AP3 from the second position estimating section 16, and estimate, as the position of the radio communication device RD, the intersection RDe of the second estimated position RD2 and a half line having the access point AP3 as one end and passing through the first estimated position RD1. It is noted that the position (referred to as final estimated position) RDe estimated by the final position estimating section 17 is estimated as the position of the radio communication device RD.

Figure 3A:
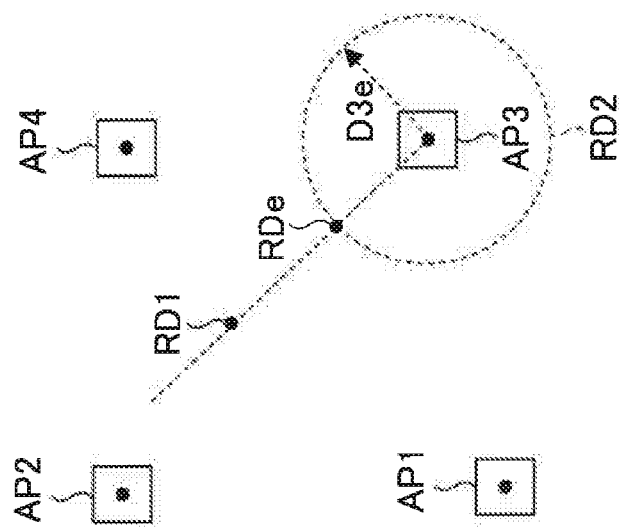
FIG. 3A shows an example of the first estimated position RD1, the second estimated position RD2, and the final estimated position RDe of the radio communication device RD.
Figure 3B:
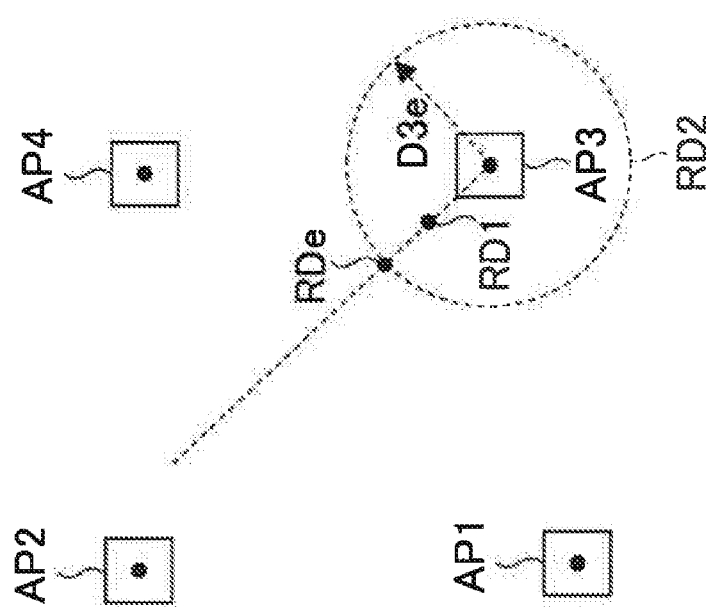
FIG. 3B shows an example of the first estimated position RD1, the second estimated position RD2, and the final estimated position RDe of the radio communication device RD.

FIGS. 3A and 3B show an example of the first estimated position RD1, the second estimated position RD2, and the final estimated position RDe of the radio communication device RD.

In the example of FIG. 3A, the first estimated position RD1 is to the upper left of the access point AP3 on the outside of the second estimated position (circle) RD2. The final estimated position RDe is on the second estimated position RD2 to the upper left of the access point AP3.

In the example of FIG. 3B, the first estimated position RD1 is to the upper left of the access point AP3 on the inside of the second estimated position (circle) RD2. Also in this case, the final estimated position RDe is on the second estimated position RD2 to the upper left of the access point AP3.

Next will be described an operation according to the embodiment of the present invention.

Based on a premise, the access points AP0 to AP4 and the radio device RD are arranged as shown in FIG. 1. A signal is transmitted from the radio device RD and received at the access points AP1 to AP4. The access point AP0 is too far from the radio device RD to receive the signal from the radio device RD.

The access points AP1 to AP4 each measure and provide the reception strengths RSSI1 to RSSI4 of the signal transmitted from the radio communication device RD to the position estimation apparatus 1.

The distance estimating section 11 of the position estimation apparatus 1 (see FIG. 2) receives the reception strengths RSSI1 to RSSI4 and estimates actual distances D1 to D4 (see FIG. 1). The estimation is performed using the formula (1) above by the distance deriving section 116 (see FIG. 4). Note here that the propagation factor pf in the formula (1) is provided by the propagation factor imparting section 112 to the distance deriving section 116 (see FIGS. 4 to 6 and the formula (2)), and the transmission power Txp [dBm] of the radio communication device RD in the formula (1) is provided by the radio device power imparting section 114 to the distance deriving section 116 (see FIGS. 4, 7, 8 and the formula (3)). Estimated distances D1e to D4e as a result of the estimation by the distance estimating section 11 are recorded in the estimated distance recording section 12.

The maximum strength detecting section 13 of the position estimation apparatus 1 receives the reception strengths RSSI1 to RSSI4 and provides the access point where the maximum reception strength is measured (AP3 in the example of FIG. 1) to the second position estimating section 16.

The second position estimating section 16 receives the access point where the maximum reception strength is measured (AP3 in the example of FIG. 1) from the maximum strength detecting section 13 and reads the estimated distance D3e corresponding to AP3 out of the estimated distance recording section 12, while reads the x coordinate and the y coordinate of AP3 (AP3x, AP3y) out of the access point position recording section 14. The second position estimating section 16 further uses the read-out estimated distance D3e and the coordinates of AP3 (AP3x, AP3y) to determine a second estimated position RD2 (a circle with a radius of D3e centered at AP3) (see FIGS. 3A and 3B).

The first position estimating section 15 reads the smaller three of the estimated distances D1e to D4e (e.g. the estimated distances D1e, D3e, D4e) out of the estimated distance recording section 12 and reads the xy coordinates of AP1, AP3, AP4 (AP1x, AP1y), (AP3x, AP3y), (AP4x, AP4y) corresponding to the estimated distances D1e, D3e, D4e out of the access point position recording section 14 to estimate the position of the radio communication device RD (first estimated position RD1) using the trilateration (see FIGS. 3A and 3B).

The final position estimating section 17 receives the first estimated position RD1 from the first position estimating section 15 and the second estimated position RD2 and its center AP3 from the second position estimating section 16. The final position estimating section 17 estimates, as the position of the radio communication device RD (final estimated position RDe), the intersection RDe of the second estimated position RD2 and a half line having the access point AP3 as one end and passing through the first estimated position RD1 (see FIGS. 3A and 3B).

In accordance with the embodiment of the present invention, the first estimated position RD1 is estimated based on three or more values of the estimated distances D1e to D4e, but may not correspond to the true position of the radio communication device RD depending on the accuracy of distance estimation. On the other hand, the second estimated position RD2 is based on the reception strength measured at the access point AP3 where the reception strength has the maximum value and thereby has high distance estimation accuracy, which can be said to be close to the true position of the radio communication device RD, but the direction of the radio communication device RD cannot be identified with respect to (e.g. to the left, right, top, or bottom of) the access point AP3 where the reception strength has the maximum value. To address this, the first estimated position RD1 and the second estimated position RD2 are combined to derive the final estimated position RDe, whereby the position of the radio communication device RD can be estimated accurately.

Moreover, in accordance with the embodiment of the present invention, since the propagation factor imparting section 112 and the radio device power imparting section 114 are arranged to obtain, based on the measurement results (reception strengths) by the access points, the propagation factor pf and the transmission power Txp [dBm] of the radio communication device RD that are used upon derivation of the estimated distances D1e to D4e, the accuracy of estimation of the estimated distances D1e to D4e can be increased and thereby the position of the radio communication device RD can be estimated accurately.

The above-described embodiment may also be implemented as follows. A computer including a CPU, a hard disk, and a medium (USB memory, CD-ROM, or the like) reading device is caused to read a medium with a program recorded thereon that achieves the above-described components (e.g. the components of the position estimation apparatus 1) and install the program in the hard disk. The above-described features can also be achieved in this manner.

DESCRIPTION OF REFERENCE NUMERAL

Figure 9:
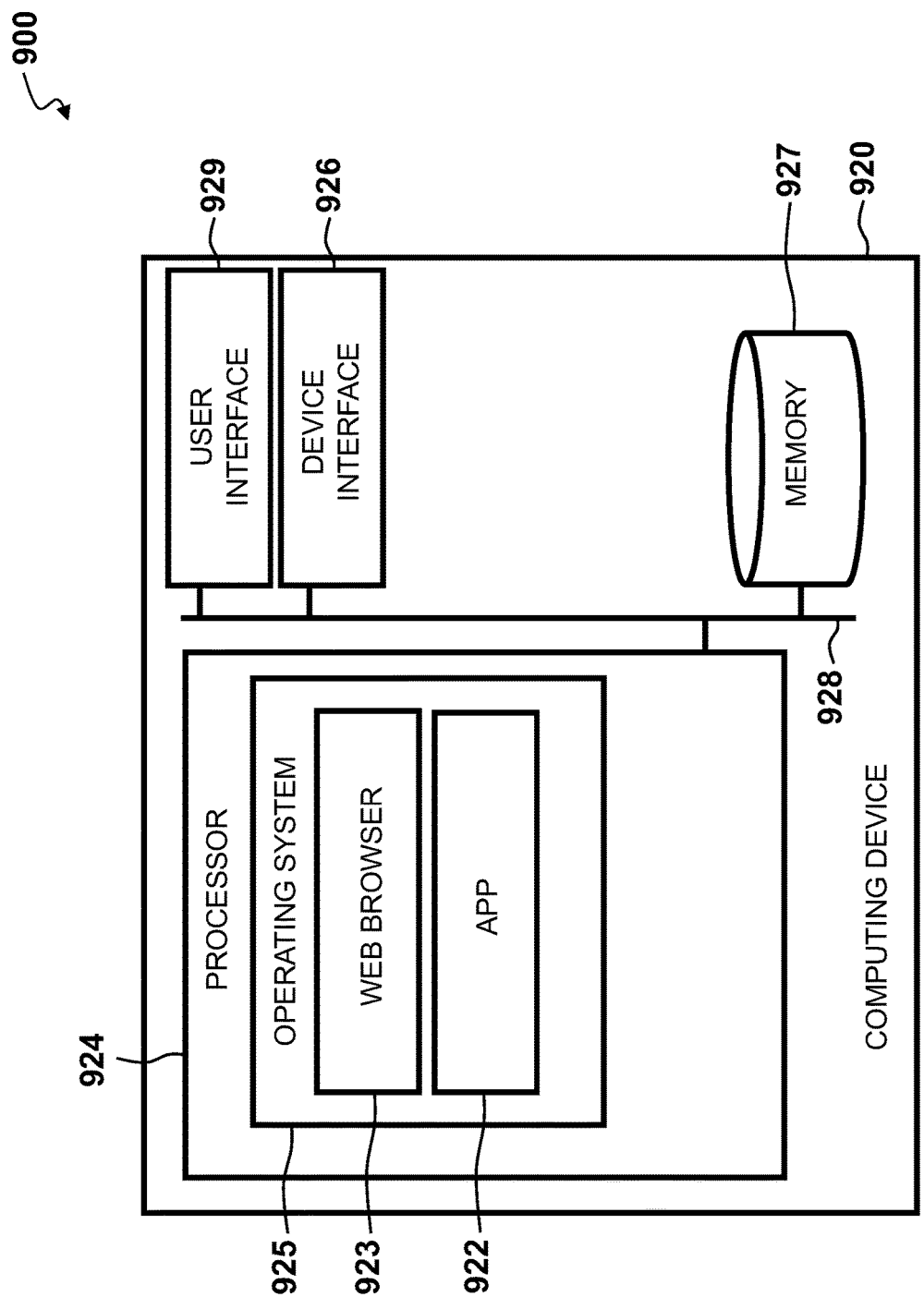
FIG. 9 illustrates an example top-level functional block diagram of a computing device embodiment.

1 Position Estimation Apparatus
11 Distance Estimating Section
112 Propagation Factor Imparting Section
114 Radio Device Power Imparting Section
116 Distance Deriving Section
12 Estimated Distance Recording Section
13 Maximum Strength Detecting Section
14 Access Point Position Recording Section
15 First Position Estimating Section
16 Second Position Estimating Section
17 Final Position Estimating Section
AP0 to AP4 Wireless LAN Access Point
RD Radio Device (Radio Communication Device)
RD1 First Estimated Position
RD2 Second Estimated Position
RDe Final Estimated Position
RSSI1 to RSSI4 Reception Strength
D1 to D4 Actual Distance
D1e to D4e Estimated Distances FIG. 9 illustrates an example of a top-level functional block diagram of a computing device embodiment 900. The example operating environment is shown as a computing device 920 comprising a processor 924, such as a central processing unit (CPU), addressable memory 927, an external device interface 926, e.g., an optional universal serial bus port and related processing, and/or an Ethernet port and related processing, and an optional user interface 929, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 928. In some embodiments, via an operating system 925 such as one supporting a web browser 923 and applications 922, the processor 924 may be configured to execute steps of a process establishing a communication channel and processing according to the embodiments described above.

System embodiments include computing devices such as a server computing device, a buyer computing device, and a seller computing device, each comprising a processor and addressable memory and in electronic communication with each other. The embodiments provide a server computing device that may be configured to: register one or more buyer computing devices and associate each buyer computing device with a buyer profile; register one or more seller computing devices and associate each seller computing device with a seller profile; determine search results of one or more registered buyer computing devices matching one or more buyer criteria via a seller search component. The service computing device may then transmit a message from the registered seller computing device to a registered buyer computing device from the determined search results and provide access to the registered buyer computing device of a property from the one or more properties of the registered seller via a remote access component based on the transmitted message and the associated buyer computing device; and track movement of the registered buyer computing device in the accessed property via a viewer tracking component. Accordingly, the system may facilitate the tracking of buyers by the system and sellers once they are on the property and aid in the seller's search for finding buyers for their property. The figures described below provide more details about the implementation of the devices and how they may interact with each other using the disclosed technology.

Figure 10:
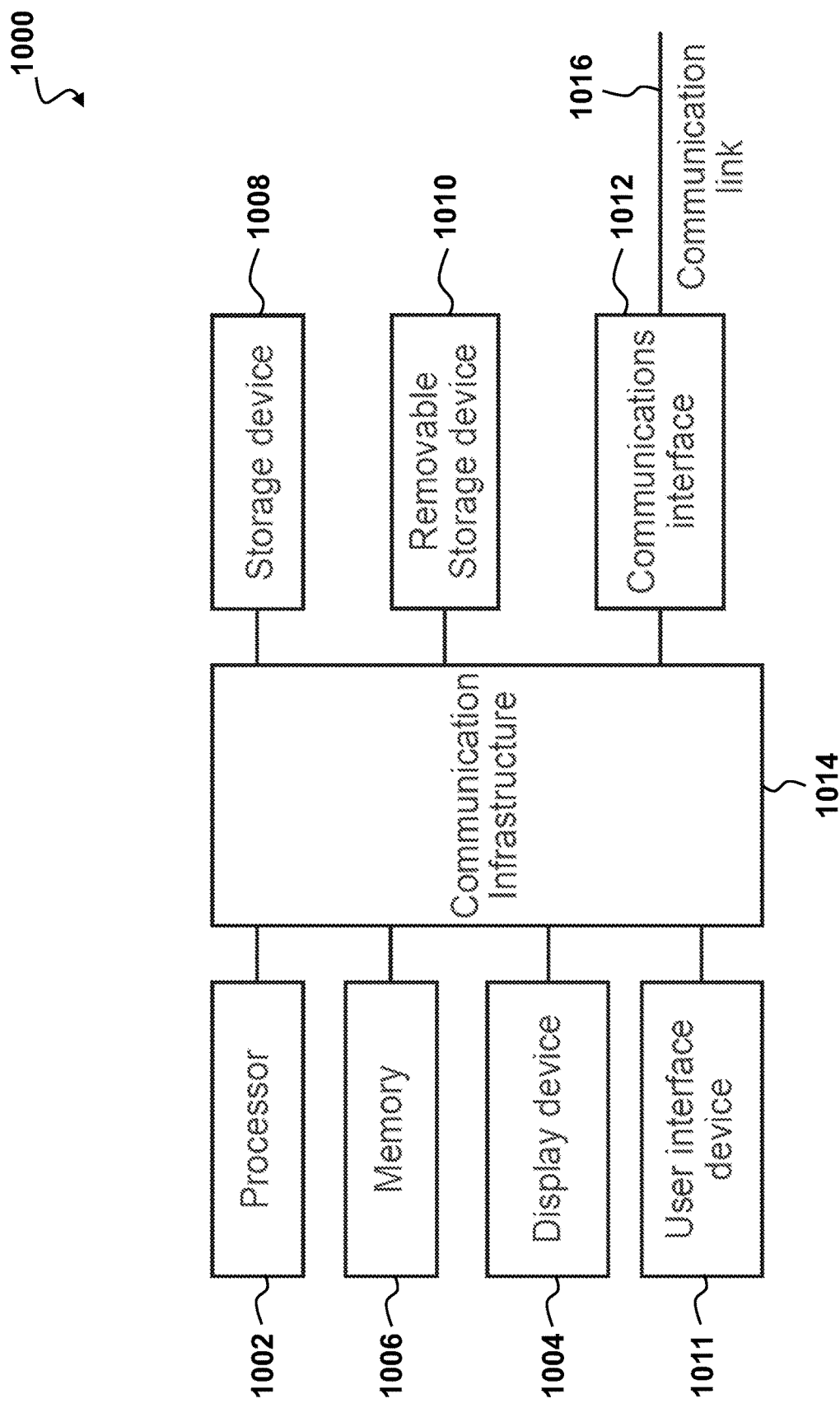
FIG. 10 shows a high-level block diagram and process of a computing system for implementing an embodiment of the system and process.

FIG. 10 is a high-level block diagram 1000 showing a computing system comprising a computer system useful for implementing an embodiment of the system and process, disclosed herein. Embodiments of the system may be implemented in different computing environments. The computer system includes one or more processors 1002, and can further include an electronic display device 1004 (e.g., for displaying graphics, text, and other data), a main memory 1006 (e.g., random access memory (RAM)), storage device 1008, a removable storage device 1010 (e.g., removable storage drive, a removable memory module, a magnetic tape drive, an optical disk drive, a computer readable medium having stored therein computer software and/or data), user interface device 1011 (e.g., keyboard, touch screen, keypad, pointing device), and a communication interface 1012 (e.g., modem, a network interface (such as an Ethernet card), a communications port, or a PCMCIA slot and card). The communication interface 1012 allows software and data to be transferred between the computer system and external devices. The system further includes a communications infrastructure 1014 (e.g., a communications bus, cross-over bar, or network) to which the aforementioned devices/modules are connected as shown.

Information transferred via communications interface 1014 may be in the form of signals such as electronic, electromagnetic, optical, or other signals capable of being received by communications interface 1014, via a communication link 1016 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1012. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 11:
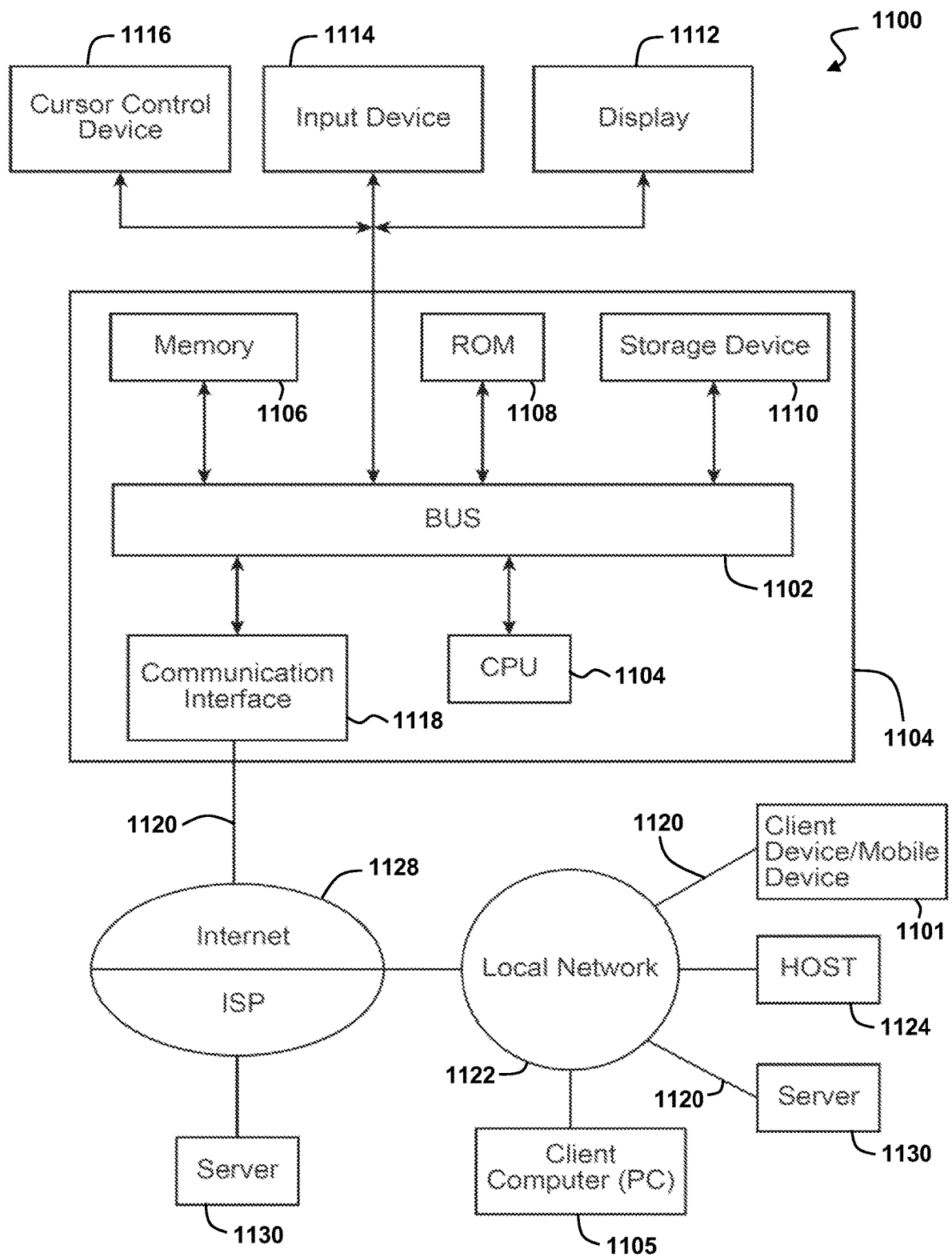
FIG. 11 shows a block diagram and process of an exemplary system in which an embodiment may be implemented.

FIG. 11 shows a block diagram of an example system 1100 in which an embodiment may be implemented. The system 1100 includes one or more client devices 1101 such as consumer electronics devices, connected to one or more server computing systems 1130. A server 1130 includes a bus 1102 or other communication mechanism for communicating information, and a processor (CPU) 1104 coupled with the bus 1102 for processing information. The server 1130 also includes a main memory 1106, such as a random access memory (RAM) or other dynamic storage device, coupled to the bus 1102 for storing information and instructions to be executed by the processor 1104. The main memory 1106 also may be used for storing temporary variables or other intermediate information during execution or instructions to be executed by the processor 1104. The server computer system 1130 further includes a read only memory (ROM) 1108 or other static storage device coupled to the bus 1102 for storing static information and instructions for the processor 1104. A storage device 1110, such as a magnetic disk or optical disk, is provided and coupled to the bus 1102 for storing information and instructions. The bus 1102 may contain, for example, thirty-two address lines for addressing video memory or main memory 1106. The bus 1102 can also include, for example, a 32-bit data bus for transferring data between and among the components, such as the CPU 1104, the main memory 1106, video memory and the storage 1110. Alternatively, multiplex data/address lines may be used instead of separate data and address lines.

The server 1130 may be coupled via the bus 1102 to a display 1112 for displaying information to a computer user. An input device 1114, including alphanumeric and other keys, is coupled to the bus 1102 for communicating information and command selections to the processor 1104. Another type or user input device comprises cursor control 1116, such as a mouse, a trackball, or cursor direction keys for communicating direction information and command selections to the processor 1104 and for controlling cursor movement on the display 1112.

According to one embodiment, the functions are performed by the processor 1104 executing one or more sequences of one or more instructions contained in the main memory 1106. Such instructions may be read into the main memory 1106 from another computer-readable medium, such as the storage device 1110. Execution of the sequences of instructions contained in the main memory 1106 causes the processor 1104 to perform the process steps described herein. One or more processors in a multi-processing arrangement may also be employed to execute the sequences of instructions contained in the main memory 1106. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1104 for execution. Such a medium may take many forms, including but not limited to, non-volatile media, volatile media, and transmission media. Non-volatile media includes, for example, optical or magnetic disks, such as the storage device 1110. Volatile media includes dynamic memory, such as the main memory 1106. Transmission media includes coaxial cables, copper wire and fiber optics, including the wires that comprise the bus 1102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1104 for execution. For example, the instructions may initially be carried on a magnetic disk of a remote computer. The remote computer can load the instructions into its dynamic memory and send the instructions over a telephone line using a modem. A modem local to the server 1130 can receive the data on the telephone line and use an infrared transmitter to convert the data to an infrared signal. An infrared detector coupled to the bus 1102 can receive the data carried in the infrared signal and place the data on the bus 1102. The bus 1102 carries the data to the main memory 1106, from which the processor 1104 retrieves and executes the instructions. The instructions received from the main memory 1106 may optionally be stored on the storage device 1110 either before or after execution by the processor 1104.

The server 1130 also includes a communication interface 1118 coupled to the bus 1102. The communication interface 1118 provides a two-way data communication coupling to a network link 1120 that is connected to the world wide packet data communication network now commonly referred to as the Internet 1128. The Internet 1128 uses electrical, electromagnetic or optical signals that carry digital data streams. The signals through the various networks and the signals on the network link 1120 and through the communication interface 1118, which carry the digital data to and from the server 1130, are exemplary forms or carrier waves transporting the information.

In another embodiment of the server 1130, interface 1118 is connected to a network 1122 via a communication link 1120. For example, the communication interface 1118 may be an integrated services digital network (ISDN) card or a modem to provide a data communication connection to a corresponding type of telephone line, which can comprise part of the network link 1120. As another example, the communication interface 1118 may be a local area network (LAN) card to provide a data communication connection to a compatible LAN. Wireless links may also be implemented. In any such implementation, the communication interface 1118 sends and receives electrical electromagnetic or optical signals that carry digital data streams representing various types of information.

The network link 1120 typically provides data communication through one or more networks to other data devices. For example, the network link 1120 may provide a connection through the local network 1122 to a host computer 1124 or to data equipment operated by an Internet Service Provider (ISP). The ISP in turn provides data communication services through the Internet 1128. The local network 1122 and the Internet 1128 both use electrical, electromagnetic or optical signals that carry digital data streams. The signals through the various networks and the signals on the network link 1120 and through the communication interface 1118, which carry the digital data to and from the server 1130, are exemplary forms or carrier waves transporting the information.

The server 1130 can send/receive messages and data, including e-mail, program code, through the network, the network link 1120 and the communication interface 1118. Further, the communication interface 1118 can comprise a USB/Tuner and the network link 1120 may be an antenna or cable for connecting the server 1130 to a cable provider, satellite provider or other terrestrial transmission system for receiving messages, data and program code from another source.

The example versions of the embodiments described herein may be implemented as logical operations in a distributed processing system such as the system 1100 including the servers 1130. The logical operations of the embodiments may be implemented as a sequence of steps executing in the server 1130, and as interconnected machine modules within the system 1100. The implementation is a matter of choice and can depend on performance of the system 1100 implementing the embodiments. As such, the logical operations constituting said example versions of the embodiments are referred to for e.g., as operations, steps or modules.

Similar to a server 1130 described above, a client device 1101 can include a processor, memory, storage device, display, input device and communication interface (e.g., e-mail interface) for connecting the client device to the Internet 1128, the ISP, or LAN 1122, for communication with the servers 1130.

The system 1100 can further include computers (e.g., personal computers, computing nodes) 1105 operating in the same manner as client devices 1101, where a user can utilize one or more computers 1105 to manage data in the server 1130.

Figure 12:
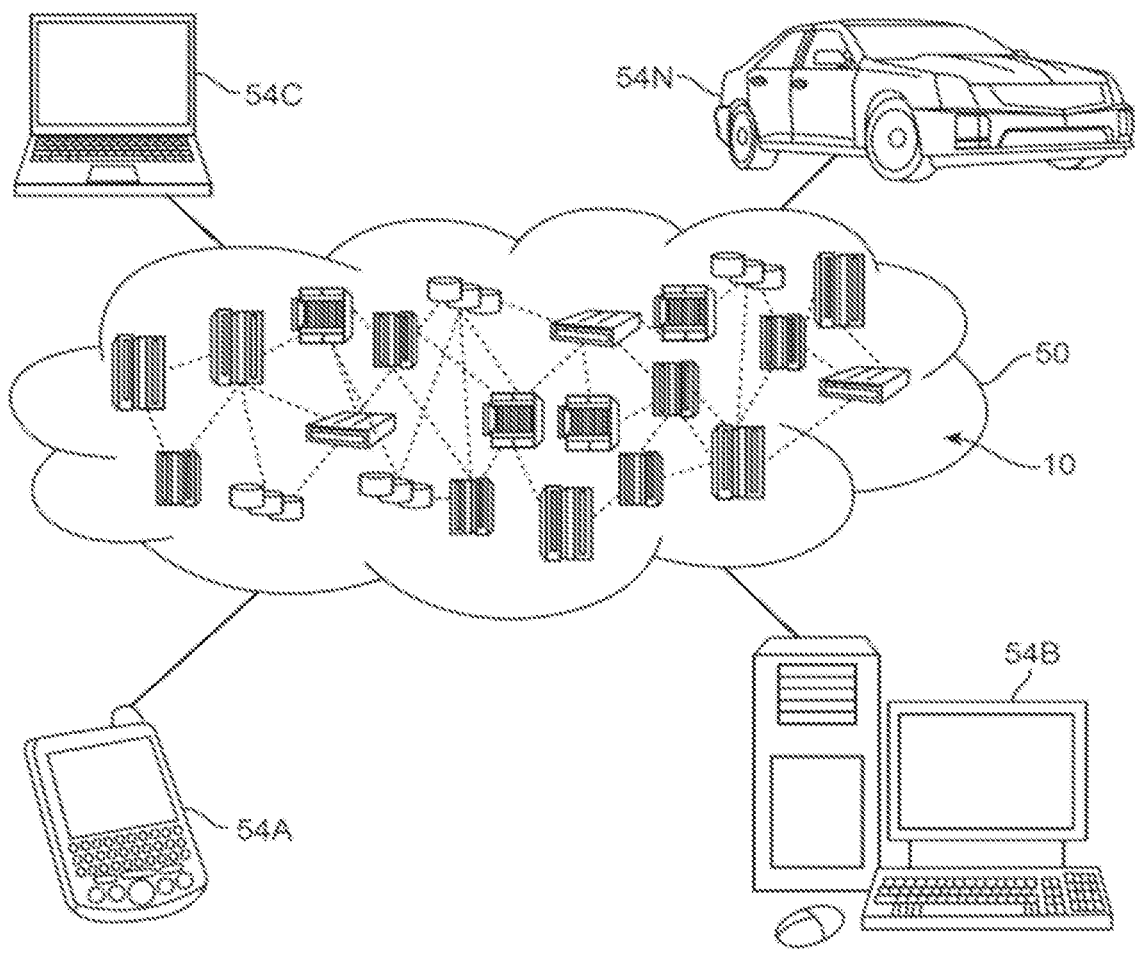
FIG. 12 depicts a cloud computing environment for implementing an embodiment of the system and process disclosed herein.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A position estimation apparatus for estimation of the position of a radio communication device that outputs a signal, the apparatus comprising:
   a distance estimating section that estimates actual distances between wireless access points that receive the signal and the radio communication device as estimated distances based on the reception strength of the signal;
   a first position estimating section that estimates the position of the radio communication device based on the estimated distances for any three or more of the wireless access points;
   a second position estimating section that estimates, as the position of the radio communication device, a circle centered at one of the wireless access points with the maximum reception strength and having one of the estimated distances estimated for the center of the circle as a radius; and
   a final position estimating section that estimates, as the position of the radio communication device, the intersection of the circle and a half line having the center as one end and passing through the position estimated by the first position estimating section, wherein
   the position estimated by the final position estimating section is estimated as the position of the radio communication device.

2. The position estimation apparatus according to claim 1, wherein
   the distance estimating section is further arranged to estimate the estimated distances based on a propagation factor, and wherein
   the propagation factor is determined based on:

the reception strength of inter-access-point communication signals that one of the wireless access points receives from another of the wireless access points;

the distance between the one wireless access point and the another wireless access point; and the transmission power of the another wireless access points.

3. The position estimation apparatus according to claim 2, wherein an average value of a plurality of reception strengths of inter-access-point communication signals at different measurement time points is used as the reception strength of the inter-access-point communication signals.

4. The position estimation apparatus according to claim 2, wherein two or more others of the wireless access points exist additionally as the another wireless access point, and wherein an average value of propagation factors for the two or more other wireless access points is used as the propagation factor.

5. The position estimation apparatus according to claim 1, wherein the distance estimating section is arranged to estimate the estimated distances based on the transmission power of the radio communication device, and wherein the transmission power of the radio communication device is determined based on a maximum value of the reception strength of the signal at all the wireless access points.

6. The position estimation apparatus according to claim 5, wherein the transmission power of the radio communication device is determined, assuming that the radio communication device exists in the vicinity of the wireless access point where the reception strength of the signal has the maximum value and that the vicinity is a free space.

7. A position estimation method for estimating the position of a radio communication device that outputs a signal, the method comprising:

estimating actual distances between wireless access points that receive the signal and the radio communication device as estimated distances based on the reception strength of the signal;

estimating the position of the radio communication device based on the estimated distances for any three or more of the wireless access points;

estimating, as the position of the radio communication device, a circle centered at one of the wireless access points with the maximum reception strength and having one of the estimated distances estimated for the center of the circle as a radius; and estimating, as the position of the radio communication device, the intersection of the circle and a half line having the center as one end and passing through the position estimated by the estimating the position of the radio communication device, wherein the position estimated by the estimating the intersection is estimated as the position of the radio communication device.

* * * * *